United States Patent
Kosicki

(12) 
(10) Patent No.: US 6,533,568 B1
(45) Date of Patent: Mar. 18, 2003

(54) CASTING MOLD WITH AN EXTRACTABLE CORE FOR PRODUCING A SHELL OF AN AIR INTAKE DUCT

(75) Inventor: Juergen Kosicki, Erligheim (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/626,387

(22) Filed: Jul. 26, 2000

(30) Foreign Application Priority Data

Jul. 27, 1999 (DE) .......................... 199 35 254

(51) Int. Cl.$^7$ ............................... B28B 11/60
(52) U.S. Cl. .................. 425/192 R; 249/102; 249/144; 249/177; 425/190; 425/577
(58) Field of Search ................ 425/182, 190, 425/192 R, 577, DIG. 239; 249/102, 142, 144, 176, 177

(56) References Cited

U.S. PATENT DOCUMENTS 4,032,105 A * 6/1977 Gritzner et al. ............. 249/134
4,159,099 A * 6/1979 Maguire ........................ 249/93
4,887,789 A * 12/1989 Harris et al. ................... 249/16
5,138,983 A  8/1992 Daly ............................. 123/52
5,575,249 A  11/1996 Mielke et al. ......... 123/184.57
5,851,456 A  12/1998 Mukawa et al. ........... 264/40.1
5,851,564 A * 12/1998 Triandafilou ................ 425/186
5,964,020 A * 10/1999 Kragle et al. ................. 29/423

FOREIGN PATENT DOCUMENTS

DE  4334141      10/1993
DE  44 37 677     4/1996

* cited by examiner

*Primary Examiner*—Jan H. Silbaugh
*Assistant Examiner*—Emmanuel S. Luk
(74) *Attorney, Agent, or Firm*—Crowell & Moring LLP

(57) ABSTRACT

A casting tool for an air intake duct includes a mold and exchangeable extractable cores for the formation of a cavity. The exchangeable extractable cores are provided for the mold, by which, while retaining the mold as such, different air intake duct geometries, especially different air intake channel cross sections, can be produced. In this manner a plurality of intake duct variants can be produced at substantially constant tool costs. This permits the economical use of injection molded synthetic resin air intake ducts, since the very expensive casting tools can be provided for a sufficient number of air intake ducts.

6 Claims, 2 Drawing Sheets

CASTING MOLD WITH AN EXTRACTABLE CORE FOR PRODUCING A SHELL OF AN AIR INTAKE DUCT

STATE OF THE ART

The invention relates to a casting mold for an air intake duct, in which an extractable core is provided to form a cavity, in accord with the general class of claim 1. The invention furthermore concerns an air intake duct which can be made with the said mold, in accord with the general class of claim 5.

Air intake ducts which are made by the multiple shell method are disclosed, for example, in DE 44 37 677 C2. In particular, plastic intake ducts can be made simply by the multiple shell method. The shells are molded individually and then welded together to form the intake duct.

Injection molds for plastic intake ducts are, however, very expensive and therefore profitable only when the ducts are produced in large numbers. To increase the output per injection mold, the document referred to describes a method in which different inserts can be placed into the shells of the air intake duct. By means of the inserts, various air channel geometries can be produced which differ from one another in length and cross section. The two intake duct shells, however, remain unaltered. By this method, therefore, intake ducts for different engine options for a vehicle model can be produced. The costs of the injection molds for the two shells are thus distributed over the entire range of engines, thereby achieving greater economy in the use of synthetic resin materials for this purpose.

The possibilities for varying the configurations by varying the insert are limited, however, by the fact that the insert forms only a certain portion of the air path.

The possibilities for varying the configurations by varying the insert are limited, however, by the fact that the insert forms only a certain portion of the air path. Certain parts of the intake passages are formed only by the mold shells, so that they have an unvarying geometry regardless of the insert that is employed. In this connection mention is to be made especially of the intake duct shells connected with the cylinder flange, by which the last section of the intake passage before the outlets at the cylinder end is formed. The cross section and geometry of this part of the intake duct must be designed for the motor model requiring the greatest amount of air. For other motor models the geometry of the intake passage is thus not optimal in this area. Precisely in the final section before the cylinder ports the air intake performance of the internal combustion engine can be very favorably influenced by an appropriate configuration of the geometry of the air intake passage.

To be sure, different injection molds could be provided for the intake duct shells according to the engine model using only mold for all models. This would, however, reduce the savings achieved by the insert part, and thus reduce the economy achievable by the solution.

The object of the invention, therefore, is to provide an air intake duct and a mold tool for producing it, which will permit a modification of the intake duct geometry at low cost.

This object is achieved by the features of claim 1 which relates to a casting tool for an intake duct. Also, according to claim 5, an intake duct is claimed which can be made with the casting tool. Finally, in claim 9 a method is claimed for making an intake duct using the casting tool.

ADVANTAGES OF THE INVENTION

The casting tool according to the invention has an extractable core for the at least partial formation of a cavity in the intake duct that is to be cast. The extractable core can be inserted into the mold thus permitting more complex component structures to be cast. When the cast intake duct shell is removed from the mold, the extractable core can be withdrawn individually from the casting, so that undercuts in the corresponding mold can be avoided.

Advantageously, a plurality of extractable cores can be provided for the mold according to the invention, and they can be interchanged in the mold as the geometry of the cavity requires. In this manner the die making costs for the creation of a series of intake ducts can be substantially reduced. The casting tool for the creation of the intake duct with the cavity remains the same. For the different models only different extractable cores need to be made, and they can be changed according to the application. The various intake duct models can accordingly be optimally adapted in their air flow control geometry to the prevailing air flow situation. In addition, it is of course also possible to broaden the variety of models through different core inserts and by modifying other intake duct bodies. The cavity to be formed does not have to be formed exclusively by the extractable core. For example, a combination technique using fusible cores can also be used. In this case the use of different fusible cores permits greater variety.

A practical embodiment of the invention provides for making the extractable core consist of a plurality of core parts. Thus the complexity of the extractable core can be increased. By an appropriate division of the core it becomes possible, for example, to create undercuts with respect to the direction in which the core is extracted.

The individual core parts can furthermore be configured advantageously so that they can be combined with one another. This increases the number of variants which can be produced by the different extractable cores. Accordingly, the number of core parts can be reduced while leaving the number of cavity geometries unchanged.

The air intake duct does not have to be made as a single part in the casting tool. In accordance with a practical embodiment of the inventive concept, it is likewise possible to produce the intake duct by a multiple-shell technique. The extractable core inserts according to invention can be contained in each of the shells.

An intake duct made with the aforementioned casting tool has, according to the invention, a wall which can be constructed with an at least partial double wall structure to form an intermediate chamber. In this way it is possible to avoid the resulting accumulation of material in the intake duct wall when different air path geometries are formed by means of core inserts of different volumes. The double wall structure is created by the intermediate spaces which are formed. The intermediate spaces can be formed by corresponding projections on the cores which are used. In this way no additional manufacturing costs arise. The advantages of the configuration described are a saving of material and the avoidance of excessive component distortion due to accumulations of material in the intake duct walls.

An especially advantageous embodiment of the invention envisions making the intermediate spaces to correspond through openings with the air-carrying interior space of the air intake duct. In this way the intermediate spaces are coupled acoustically with the air guiding geometry of the intake duct. The resultant damping effects have a positive effect on the intake noise of the internal combustion engine.

The intermediate spaces can be used, for example, as shunt resonator or as a resonating tube. The geometry of the opening can influence the quality of the acoustical effect. The geometry of the interstitial spaces themselves is determined by the available wall thickness.

The use of the extractable cores is especially advantageous to the configuration of the final sections of the intake channels toward the outlets at the cylinder end. In this area a modification of the air guidance geometry of the intake channels can be achieved, resulting in many possibilities for influencing the air stream. Due to this nearness to the cylinder ports, streamlining measures in this portion of the intake duct are especially effective.

A variant of the intake duct that is especially advantageous in regard to production will result from making the said opening to the interstitial spaces as a cut-out which opens into the plane of the outlets provided. This opening can be formed by the extractable core without any undercutting. The opening is partially formed by the cylinder head after the intake duct has been mounted on it.

The use of different extractable cores in the area of the cylinder head flange of the intake duct especially enables the intake passages to be adapted to variant motor models of different power. Internal combustion engines of lower power require a smaller cross section in the intake channels. In this area it is possible to use extractable cores which produce a smaller intake channel cross section. Since the outer wall of the air intake channel, however, is established by the casting tool that is used, the greater wall thickness that results must be reduced by the said interstitial spaces. In this area the result is a double-walled structure of the intake duct, and the interstices can be used as described to influence the intake noise, and they can be created in the intake duct without additional manufacturing cost. This has the additional advantage that, in motors of lower power, an additional noise-suppressing effect is produced. Especially in the case of lower-power motors other noise-suppressing measures frequently need to be avoided for reasons of cost. The utilization of the intermediate spaces offers a lower-cost alternative.

The method according to claim 9 is suitable for producing the described intake duct with the aid of the casting tool according to the invention. Before the intake duct or the intake duct shell in produced, the appropriate extractable cores are selected and secured in the casting mold. The parts of the mold are assembled and then injected with the intake duct material. Especially, synthetic resin material is used for this purpose. After the cast material has cooled the component can be removed from the mold. In the course of this, the extractable cores can be removed individually, if desired. In the case of multi-part extractable cores it is even possible to remove the core parts individually.

These and additional features of preferred embodiments of the invention will be found not only in the claims but also in the description and the drawings, and the individual features can be realized individually or jointly in the form of subcombinations in the embodiments of the invention and in other fields and may represent advantageous as well as independently patentable embodiments, for which protection is hereby claimed.

DRAWING

Additional details of the invention are described in the drawings with reference to schematic working embodiments.

DESCRIPTION OF WORKING EMBODIMENTS

Figure 1:
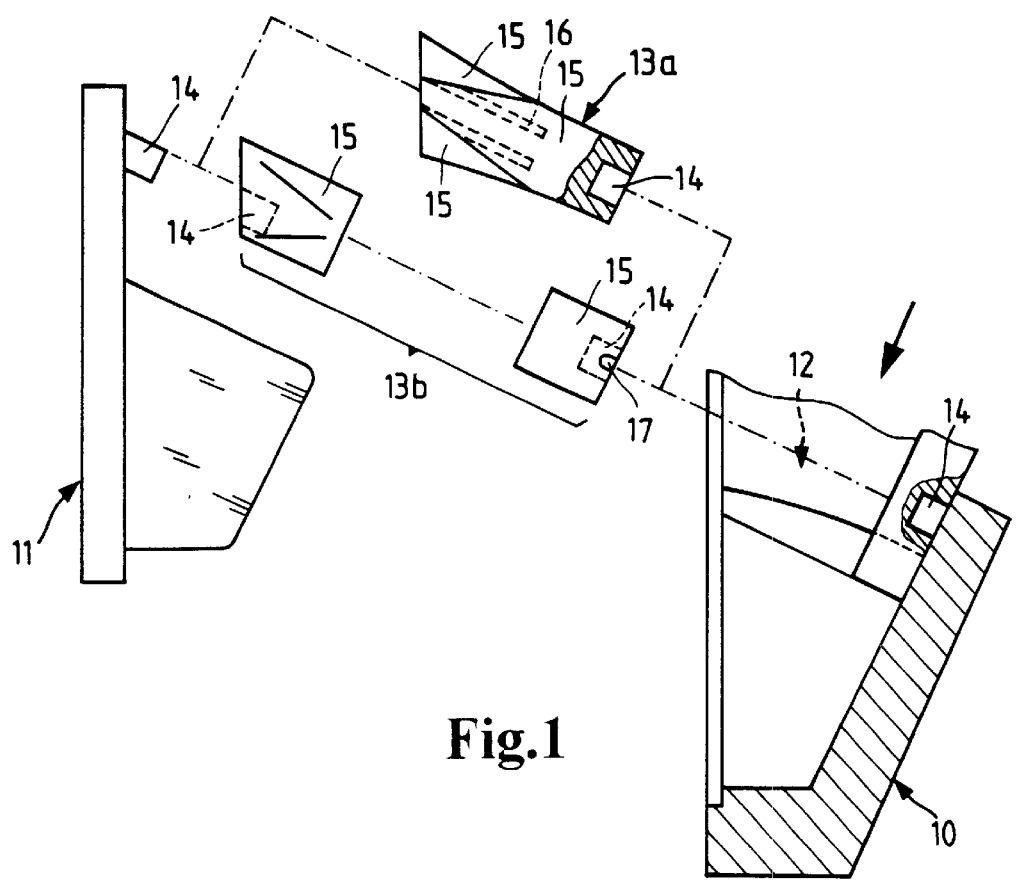
FIG. 1 shows a casting mold for the flange-end shells of an air intake duct with two possible extractable cores that can be used, with the mold being shown partially in section.

The casting mold of FIG. 1 is comprised of an outer half 10 and an inner half 11. The casting tool has an additional cover half, not shown, which is applied from the direction of the arrow on the other side of the dividing line of the outer half 10. To form a cavity indicated at 12 in the outer half 10, different extractable cores 13a and 13b can be secured in at least one of the mold halves. For this purpose supports 14 are provided. The extractable cores are comprised of individual core parts 15 which can be fixed in position relative to one another by connectors 16. The core part of extractable core 13b at the outlet end additionally has a projection 17 for forming an opening, not shown, in the wall of the intake duct (cf. FIGS. 4 and 5).

When the mold tool is assembled the core parts 15 of the selected extractable core are secured in the mold. They can subsequently be injected, so that the shell of a synthetic resin intake duct, for example, is formed. The core parts can be removed from the intake duct shell after the mold halves are taken off.

Figure 2:
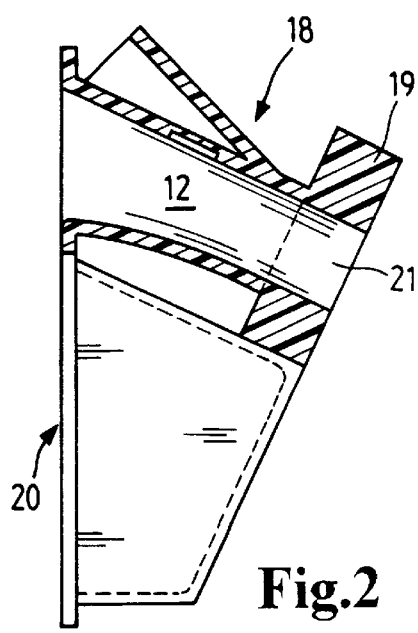
FIG. 2 shows an intake duct shell in a partially sectioned side view, as it can be produced with the mold tool of FIG. 1 using one of the two extractable cores.

An intake duct shell 18, shown in FIG. 2, was produced by means of the extractable core 13a. A cylinder head flange 19 can be seen, and an indicated connecting flange 20 for further intake duct shells. The upper part of the shell is shown in cross section. The hollow cavity 12 can be seen, which represents the last portion of an intake passage of the intake duct toward the cylinder head.

Figure 3:
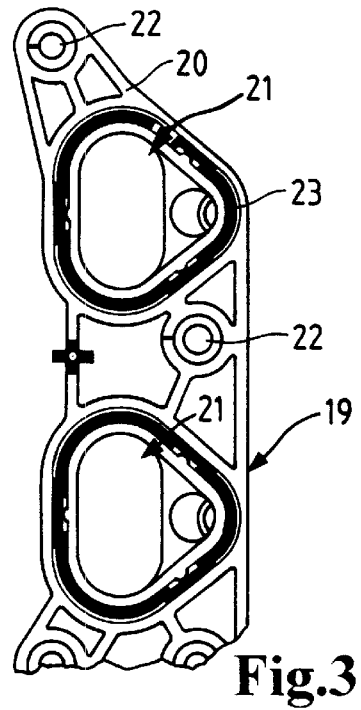
FIG. 3 shows a top view of the cylinder head flange of the intake duct of FIG. 2.

A comparison of the shell with the representation of the cylinder head flange 19 in FIG. 3 shows that the hollow cavity changes its cross-sectional shape from the cylinder head flange 19 to the connecting flange 20. This is explained by the configuration of the extractable core 13a of FIG. 1 which is put together from a plurality of parts. These parts can be extracted one after the other through an outlet 21 formed by the hollow cavity 12. The connectors 16 of the extractable core 13a are aligned in the direction of extraction of the core, so that no undercuts result between the core parts 15. In FIG. 3, screw holes 22 for fastening the intake duct flange to the cylinder head and gaskets 23 also can be seen.

Figure 4:
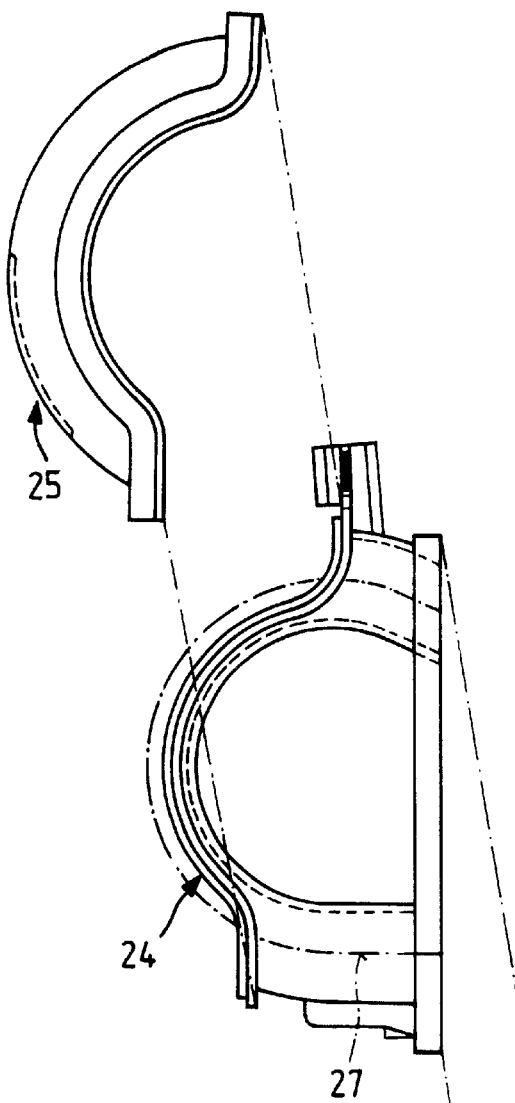
FIG. 4 shows three intake duct shells before the assembly of the intake duct, with the shell on the cylinder head end being made with the casting tool according to FIG. 1 using the other extractable core.
Figure 5:
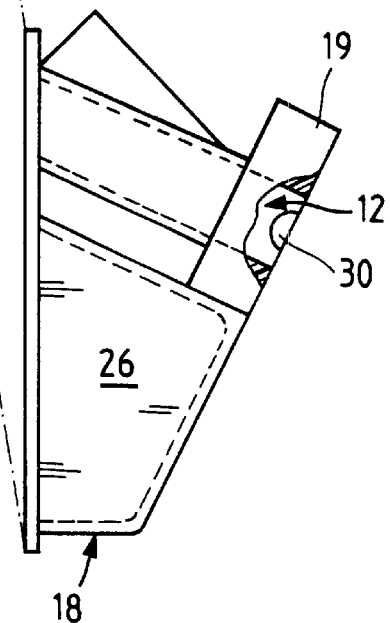
FIG. 5 shows a top view of the cylinder head flange of the intake duct of FIG. 4.

FIG. 4 shows the combination of the shells 18 already described, with a center part 24 and an intake passage cover 25 to form a complete intake duct. Through modification of the center part 24, the geometry of the intake passages can also be influenced in the rest of the intake duct. Also, in order to form parts of the intake passage, a number of extractable cores can be used in the center part in the manner described in FIG. 1. A hollow structure 26 in the shell and the center shell 24 together form the manifold chamber from which the individual air intake channels 27 branch off.

The cylinder head flange 19 illustrated in FIG. 4 was produced by the extractable core 13b of FIG. 1. The resulting hollow cavity 12 has a smaller cross-sectional area than the one produced with core 13a. This is apparent from a comparison of FIGS. 3 and 5. Except for the cross-sectional area of the hollow cavity 12 and intermediate spaces 29, the cylinder head flange illustrated in FIG. 5 does not differ from the one according to FIG. 3. The outlets 21 with the smaller cross-sectional area can be seen. A wall 28 of the intake duct in the area of the cylinder head flange is partially constructed as a double wall. In this way intermediate spaces 29 are formed but the wall thickness of the wall remains substantially the same despite the fact that the outside diameter of the intake duct remains the same and the cross section of the hollow cavity 12 is smaller. In order to connect the intermediate spaces 29 with the hollow cavity 12, openings 30 are provided in the inner part of the double wall, which are formed by the projections 17 of the extractable core 13*b* according to FIG. 1. These can also be seen in FIG. 4.

What is claimed is:

1. A casting tool for producing a shell of an air intake duct, the shell having a double wall with an intermediate space, at least one cylinder head flange and one connection flange for additional intake duct shells, the air intake duct having an interior cavity, said casting tool comprising at least one mold member and an extractable core, said extractable core at least partially forming the interior cavity of the air intake duct, wherein said extractable core is exchangeable in the casting tool in order to form different cavity variants and wherein at least one of the mold member and extractable core is configured to produce the double wall with the intermediate space, the at least one cylinder head flange and the connection flange.

2. A casting tool according to claim 1, wherein said extractable core comprises a plurality of core parts.

3. A casting tool according to claim 2, wherein said core parts of the exchangeable extractable cores are interchangeably combinable with other core parts to form extractable cores having different configurations.

4. A casting tool according to claim 1, wherein said mold member and said extractable core define the configuration of a shell which is assembled with at least one other shell to form the air intake duct.

5. A casting tool according to claim 1, wherein the double wall includes an inner wall having an opening connecting the interior cavity to the intermediate space.

6. A casting tool according to claim 5, wherein the extractable core includes a projection for forming the opening.

* * * * *